US008847505B2

United States Patent
Chen et al.

(10) Patent No.: US 8,847,505 B2
(45) Date of Patent: Sep. 30, 2014

(54) ILLUMINATION CONTROL CIRCUIT AND ILLUMINATION CONTROL METHOD

(75) Inventors: Po-Shen Chen, New Taipei (TW); Chun-Kuang Chen, Taipei (TW); Feng-Ling Lin, Pingtung (TW); Hui-Ying Chen, Changhua County (TW)

(73) Assignee: Lextar Electronics Corporation, Hsinchu (TW)

( * ) Notice: Subject to any disclaimer, the term of this patent is extended or adjusted under 35 U.S.C. 154(b) by 172 days.

(21) Appl. No.: 13/562,306

(22) Filed: Jul. 30, 2012

(65) Prior Publication Data

US 2013/0169183 A1 Jul. 4, 2013

(30) Foreign Application Priority Data

Jan. 2, 2012 (TW) .............................. 101100081 A (51) Int. Cl.
*H05B 37/02* (2006.01)

(52) U.S. Cl.
USPC ........ 315/224; 315/194; 315/200 R; 315/225; 315/209 R; 315/287

(58) Field of Classification Search
CPC ........... H05B 33/0815; H05B 41/2828; H05B 33/0845; H05B 33/0848; H05B 37/02; H05B 39/09; H05B 41/2981; H05B 41/3921; H05B 33/0809; H05B 39/044; H05B 41/3924; Y02B 20/146
USPC .......... 315/194, 200 R, 209 R, 224, 225, 287, 315/291
See application file for complete search history.

(56) References Cited

U.S. PATENT DOCUMENTS

| 5,650,694 | A | * | 7/1997 | Jayaraman et al. | ............ 315/225 |
| 5,969,482 | A | * | 10/1999 | Gradzki | .......................... 315/224 |
| 7,667,408 | B2 | * | 2/2010 | Melanson et al. | ......... 315/209 R |
| 7,852,017 | B1 | * | 12/2010 | Melanson | ...................... 315/291 |
| 8,018,171 | B1 | * | 9/2011 | Melanson et al. | .............. 315/194 |
| 8,188,677 | B2 | * | 5/2012 | Melanson et al. | .............. 315/291 |
| 8,324,822 | B2 | * | 12/2012 | Peng | .......................... 315/209 R |
| 8,508,147 | B2 | * | 8/2013 | Shen | .............................. 315/287 |
| 8,536,794 | B2 | * | 9/2013 | Melanson et al. | .............. 315/291 |
| 2006/0001381 | A1 | | 1/2006 | Robinson et al. | |
| 2011/0084622 | A1 | | 4/2011 | Barrow et al. | |
| 2011/0279061 | A1 | | 11/2011 | Lee et al. | |
| 2012/0235585 | A1 | * | 9/2012 | Lys et al. | ................... 315/200 R |

FOREIGN PATENT DOCUMENTS

| TW | M366854 U | 10/2009 |
| TW | 201119501 | 6/2011 |
| WO | WO2007071033 A1 | 6/2007 |

* cited by examiner

*Primary Examiner* — Vibol Tan
(74) *Attorney, Agent, or Firm* — CKC & Partners Co., Ltd.

(57) ABSTRACT

The invention discloses an illumination control circuit and an illumination control method. The illumination control method includes modulating an alternating current input signal and accordingly generating a dimming signal, which includes several waveform pulses each with an adjustable conduction angles; continuously sampling the waveform pulses of the dimming signal and forming an average waveform pulse from the sampled waveform pulses; extracting the average waveform pulse, which has an average conduction angle corresponding to the conduction angles of the waveform pulses; performing an integration on the sampled average waveform pulse and accordingly generating a current-controlling signal; and driving an illumination lamp according to the current-controlling signal.

9 Claims, 8 Drawing Sheets

ILLUMINATION CONTROL CIRCUIT AND ILLUMINATION CONTROL METHOD

RELATED APPLICATIONS

This application claims priority to Taiwan Patent Application Serial Number 101100081, filed Jan. 2, 2012, which is herein incorporated by reference.

BACKGROUND

1. Technical Field

The present disclosure relates to an illumination control circuit. More particularly, the present disclosure relates to an illumination control circuit with dimming functions.

2. Description of Related Art

With recent developments in photonics technology, many cutting-edge illumination devices are being used in our daily lives. For example, there has been significant development with respect to fluorescent lamps and light-emitting diodes (LEDs) and their applications.

An LED lamp has an efficiency superior to a traditional incandescent lamp, because most of the energy consumed by an LED lamp is transformed into visible radiation. As a result of its high efficiency (i.e., high photoelectric conversion efficiency), which is far higher than that of other lamps, the LED lamp generates less heat during operation. Stated differently, for the same luminance, an LED lamp has a lower operating temperature than that of a traditional incandescent lamp. Therefore, the LED lamp is in line with green energy trends and is widely used in all kinds of illumination applications.

Traditional incandescent lamps may be used in cooperation with a tri-electrode alternating-current switch (TRIAC) dimmer, so that users can conveniently adjust the luminance of the incandescent lamps, allowing less energy to be used and permitting alleviation of any eye discomfort due to over-brightness. A TRIAC dimmer typically includes a variable resistor, in which a resistance can be adjusted by a user (e.g., by rotating a knob of the TRIAC dimmer). In this way, users are able to control a conductive angle of the TRIAC, so as to change an output waveform of the TRIAC.

Figure 1:
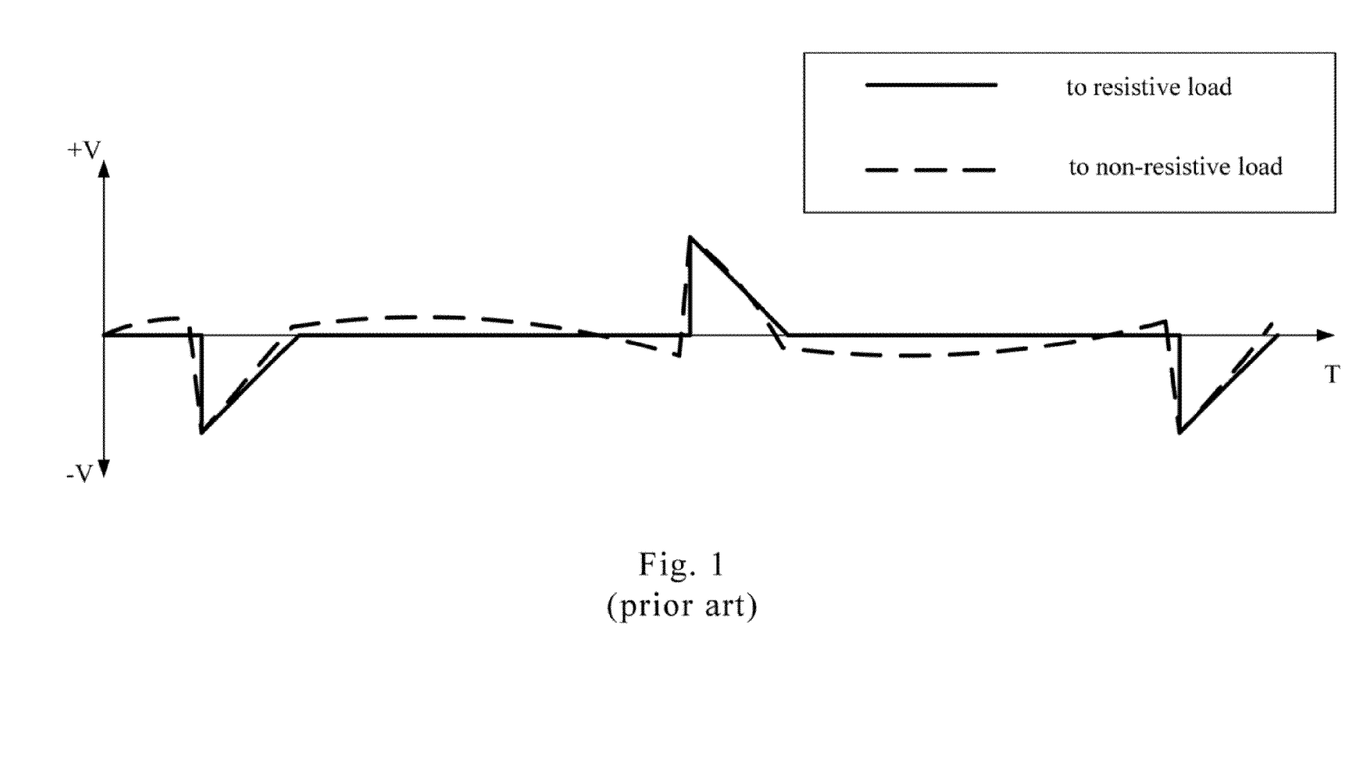
FIG. 1 is a schematic diagram illustrating a dimming signal waveform generated by a traditional TRIAC dimmer.

The dimming function of a TRIAC dimmer is realized in a phase-chopping manner. Reference is made to FIG. 1, which is a schematic diagram illustrating a dimming signal waveform generated by a traditional TRIAC dimmer. In FIG. 1, the waveform generated by the TRIAC dimmer is chopped according to its phases, and the dimming result is related to the conductive angle of the phase-chopping.

The TRIAC dimmer is mainly used for a resistive load (e.g., a fluorescent lamp). However, an LED lamp is a non-resistive load. When a traditional TRIAC dimmer is directly utilized to control the luminance of an LED lamp, the relationship between an output voltage (or current) of the dimming signal and the conduction angle of the dimming signal will be non-linear. This will cause non-linear distortion, especially when the conduction angle is small.

Currently, LED devices utilize specific LED drivers for transforming household electricity into a fixed DC voltage signal, which is used to drive the light-emitting component in an LED for illumination. Such a DC voltage signal is set at a fixed voltage level, and as a result, luminance cannot be adjusted easily. For the sake of energy conservation and to allow user adjustability of brightness, there is a need to develop LED illumination devices that have a practical dimming function.

SUMMARY

In order to solve the problems in the art, the disclosure provides an illumination control circuit and an illumination system.

An aspect of the invention is to provide an illumination control circuit coupled between a household electricity input and an illumination lamp. The illumination control circuit includes a dimming module, a sample-and-hold circuit, a signal detection circuit and an average power integrator circuit. The dimming module is coupled with the household electricity input and is configured for modulating an alternating current input signal from the household electricity input and generating a dimming signal. The dimming signal includes a plurality of waveform pulses. Each of the waveform pulses has a conduction angle which is adjustable. The sample-and-hold circuit is coupled with the dimming module and is configured for continuously sampling the waveform pulses of the dimming signal to obtain an average waveform pulse from sampled waveform pulses. The signal detection circuit is coupled with the sample-and-hold circuit and is configured for extracting the average waveform pulse. The average waveform pulse has an average conduction angle corresponding to the conduction angles of the waveform pulses. The average power integrator circuit is coupled with the signal detection circuit and is configured for performing integration on the average waveform pulse after sampling, so as to generate a current-controlling signal and transmit the same to the illumination lamp. The current-controlling signal is configured for controlling a driver circuit of the illumination lamp, and a driving power of the driver circuit and the average conduction angle have a linear relationship therebetween.

According to an embodiment of the disclosure, the current-controlling signal is transmitted to the driver circuit of the illumination lamp. The current-controlling signal is configured for controlling an amplitude of an operating current generated by the driver circuit. The operating current goes through a light-emitting load of the illumination lamp.

According to an embodiment of the disclosure, the average conduction angle, a signal level of the current-controlling signal and the amplitude of the operating current are in proportion to a luminance of the illumination lamp.

Another aspect of the invention is to provide an illumination control circuit coupled between a household electricity input and an illumination lamp. The illumination control circuit includes a dimming module, a sample-and-hold circuit, a signal detection circuit, an average power integrator circuit and a driver circuit. The dimming module is coupled with the household electricity input and is configured for modulating an alternating current input signal from the household electricity input and generating a dimming signal. The dimming signal includes a plurality of waveform pulses. Each of the waveform pulses has a conduction angle which is adjustable. The sample-and-hold circuit is coupled with the dimming module and is configured for continuously sampling the waveform pulses of the dimming signal to obtain an average waveform pulse from sampled waveform pulses. The average waveform pulse has an average conduction angle corresponding to the conduction angles of the waveform pulses. The signal detection circuit is coupled with the sample-and-hold circuit and is configured for extracting the average waveform pulse. The average power integrator circuit is coupled with the signal detection circuit and is configured for performing integration on the average waveform pulse after sampling, so as to generate a current-controlling signal. The driver circuit is coupled with the average power integrator circuit. The driver circuit generates an operating current to the illumination lamp according to the current-controlling signal. A driving power of the driver circuit and the average conduction angle has a linear relationship therebetween.

According to an embodiment of the disclosure, the current-controlling signal is configured for controlling an amplitude of the operating current. The operating current goes through a light-emitting load of the illumination lamp.

According to an embodiment of the disclosure, the average conduction angle, a signal level of the current-controlling signal and the amplitude of the operating current are in proportion to a luminance of the illumination lamp.

Another aspect of the invention is to provide an illumination control method which includes modulating an alternating current input signal for generating a dimming signal, the dimming signal comprising a plurality of waveform pulses, each of the waveform pulses having a conduction angle which is adjustable; continuously sampling the waveform pulses of the dimming signal and obtaining an average waveform pulse from the sampled waveform pulses; extracting the average waveform pulse having an average conduction angle corresponding to the conduction angles of the waveform pulses; performing integration on the average waveform pulse after sampling, so as to generate a current-controlling signal; and driving an illumination lamp according to the current-controlling signal, and maintaining a linear relationship between a driving power of the driver circuit and the average conduction angle.

According to an embodiment of the disclosure, the current-controlling signal is configured for controlling an amplitude of an operating current going through the illumination lamp.

According to an embodiment of the disclosure, the average conduction angle, a signal level of the current-controlling signal and the amplitude of the operating current are in proportion to a luminance of the illumination lamp.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

This disclosure provides an illumination control circuit and an illumination control method. In an embodiment, the illumination control circuit includes a dimming module for adjusting the luminance of an illumination lamp, and it further includes some digital processing circuits to sample the dimming signals generated by the dimming module and to generate an average waveform pulse with an average conduction angle, and so as to control an operating current generated by the driver circuit according to the average waveform pulse. The dimming signal can be represented as a direct current (DC) value, so as to avoid non-linear distortion which occurs at a low conduction angle of the dimming waveform in a traditional design. In this case, the average conduction angle of the dimming module in the disclosure and the driving power of the driver circuit have a linear relationship therebetween.

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 2:
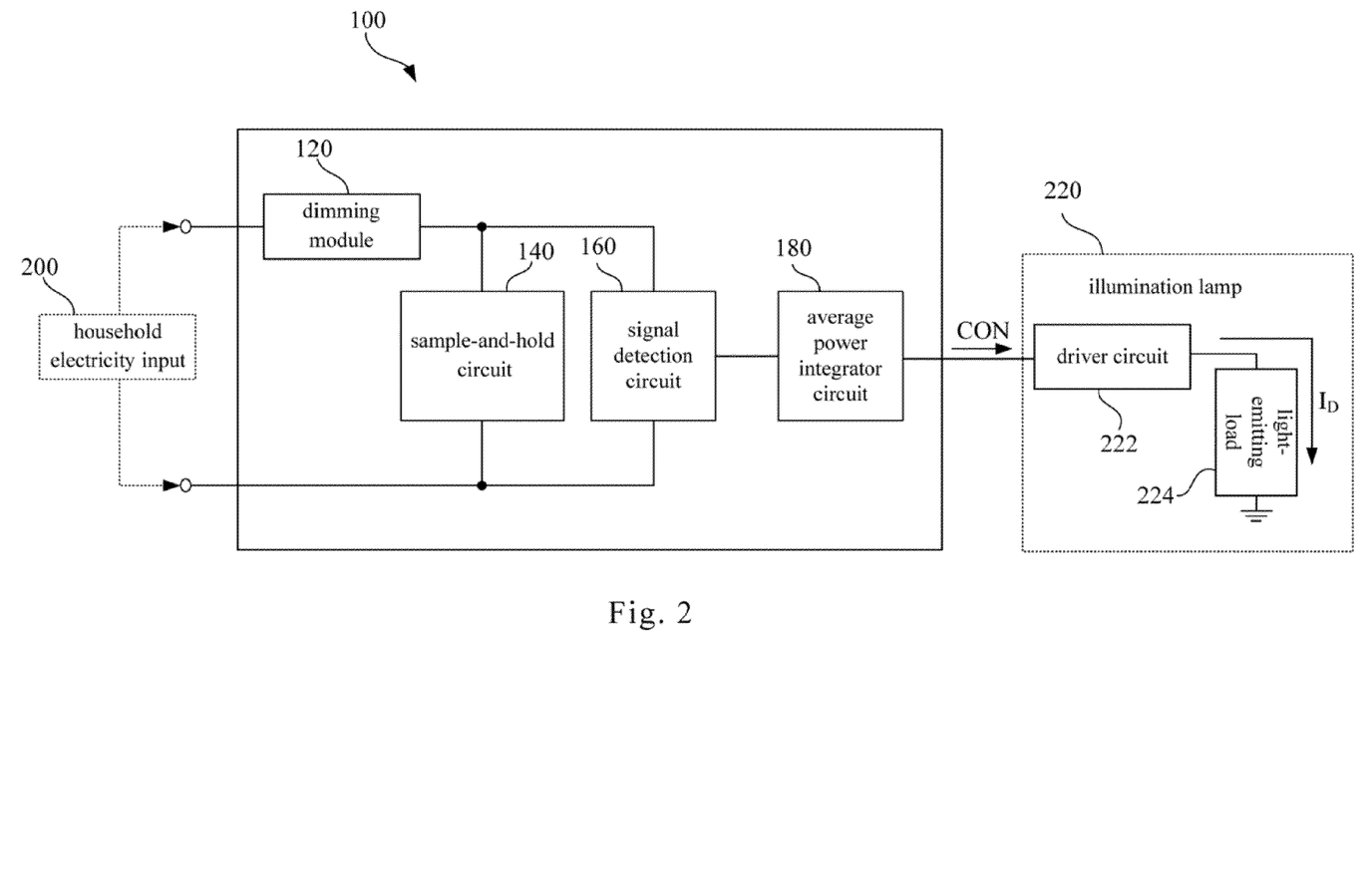
FIG. 2 is a block diagram illustrating an illumination control circuit according to an embodiment of the invention.

Reference is made to FIG. 2, which is a block diagram illustrating an illumination control circuit 100 according to an embodiment of the invention. As shown in FIG. 2, the illumination control circuit 100 is coupled between a household electricity input 200 and an illumination lamp 220. The illumination control circuit 100 includes a dimming module 120, a sample-and-hold circuit 140, a signal detection circuit 160 and an average power integrator circuit 180.

The dimming module 120 is coupled with the household electricity input 200. The household electricity input 200 usually provides an alternating current (AC) input signal (e.g., an 110V/220V AC voltage signal). The dimming module 120 is used to modulate the AC input signal from the household electricity input 200 into a dimming signal. In this embodiment, the dimming module 120 can be a tri-electrode alternating-current switch (TRIAC) dimmer. The dimming function of the TRIAC dimmer is realized in a phase-chopping manner. The waveform generated by the TRIAC dimmer is chopped by its phases. The dimming level is related to a conductive angle in the phase-chopping process.

Figure 3:
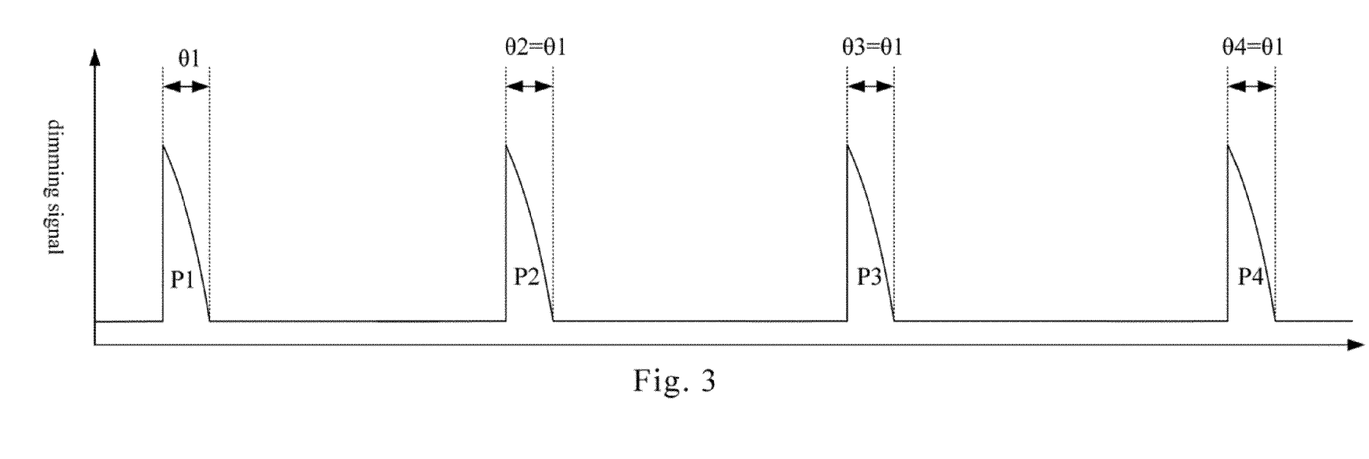
FIG. 3 is a waveform diagram illustrating a dimming signal generated by a dimming module of FIG. 2 under ideal conditions.
Figure 4:
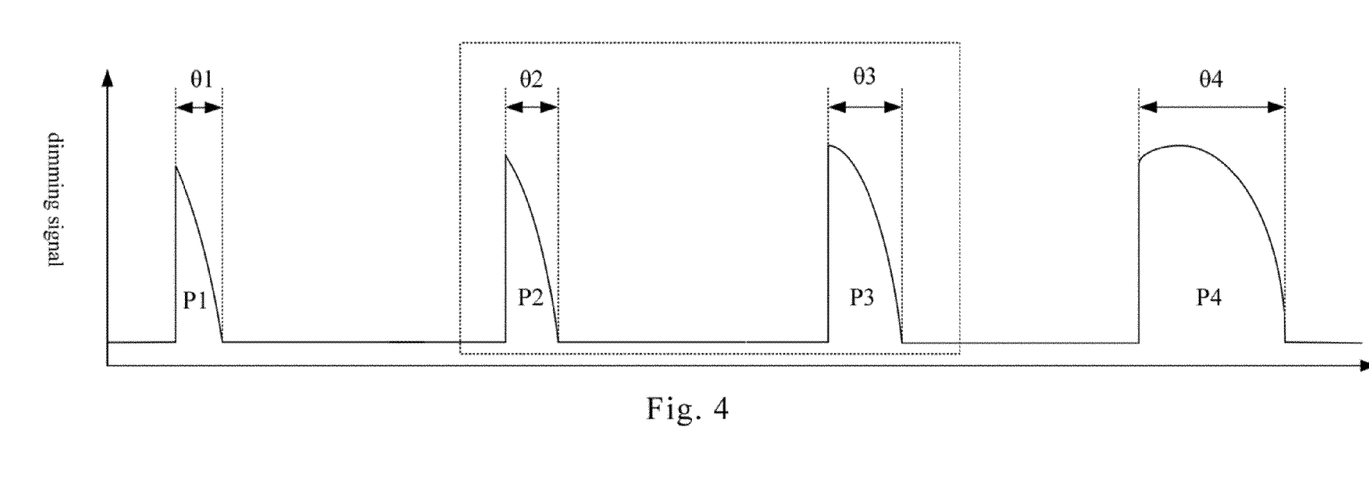
FIG. 4 is a waveform diagram illustrating a dimming signal generated by the dimming module of FIG. 2 under practical conditions.

Reference is also made to FIG. 3 and FIG. 4. FIG. 3 is a waveform diagram illustrating a dimming signal generated by the dimming module 120 under ideal conditions. FIG. 4 is a waveform diagram illustrating a dimming signal generated by the dimming module 120 under practical conditions.

As shown in FIG. 3 and FIG. 4, each waveform pulse P1, P2, P3 or P4 of the dimming signal has a conductive angle θ1, θ2, θ3 or θ4. The conductive angles θ1, θ2, θ3 and θ4 of the waveform pulses P1, P2, P3 and P4 are adjustable. For example, when the dimming module 120 is a TRIAC dimmer, users may rotate a knob of the TRIAC dimmer to adjust the conductive angles θ1, θ2, θ3 and θ4 for elevating a brightness level. In this case, the conductive angles θ1, θ2, θ3 and θ4 will be enlarged to realize such elevation of the brightness level.

With respect to the situation under ideal conditions shown in FIG. 3, the dimming signal generated by the dimming module 120 includes multiple waveform pulses. As shown in FIG. 3, when the dimming module 120 is configured to a specific brightness level by a user, the waveform pulses P1, P2, P3 and P4 generated by the dimming module 120 in sequence have an identical conductive angle. That is, each of the conductive angles of the waveform pulses P1, P2, P3 and P4 is equal to the conductive angle θ1.

However, in practical applications, some small differences will exist between the waveform pulses P1, P2, P3 and P4 generated by the dimming module 120 because of limitations associated with the manufacturing process, even when the dimming level remains unchanged. As shown in FIG. 4, in a state where the dimming level remains unchanged, the waveform pulses P1, P2, P3 and P4 generated in sequence still have different conductive angles, such as the conductive angles θ1, θ2, θ3 and θ4.

Referring to FIG. 2 and FIG. 4, the sample-and-hold circuit 140 of the illumination control circuit 100 in the embodiment is coupled to the dimming module 120 and is used for continuously sampling the waveform pulses P1, P2, P3 and P4 of the dimming signal, so as to obtain an average waveform pulse from the sampled waveform pulses.

Figure 5:
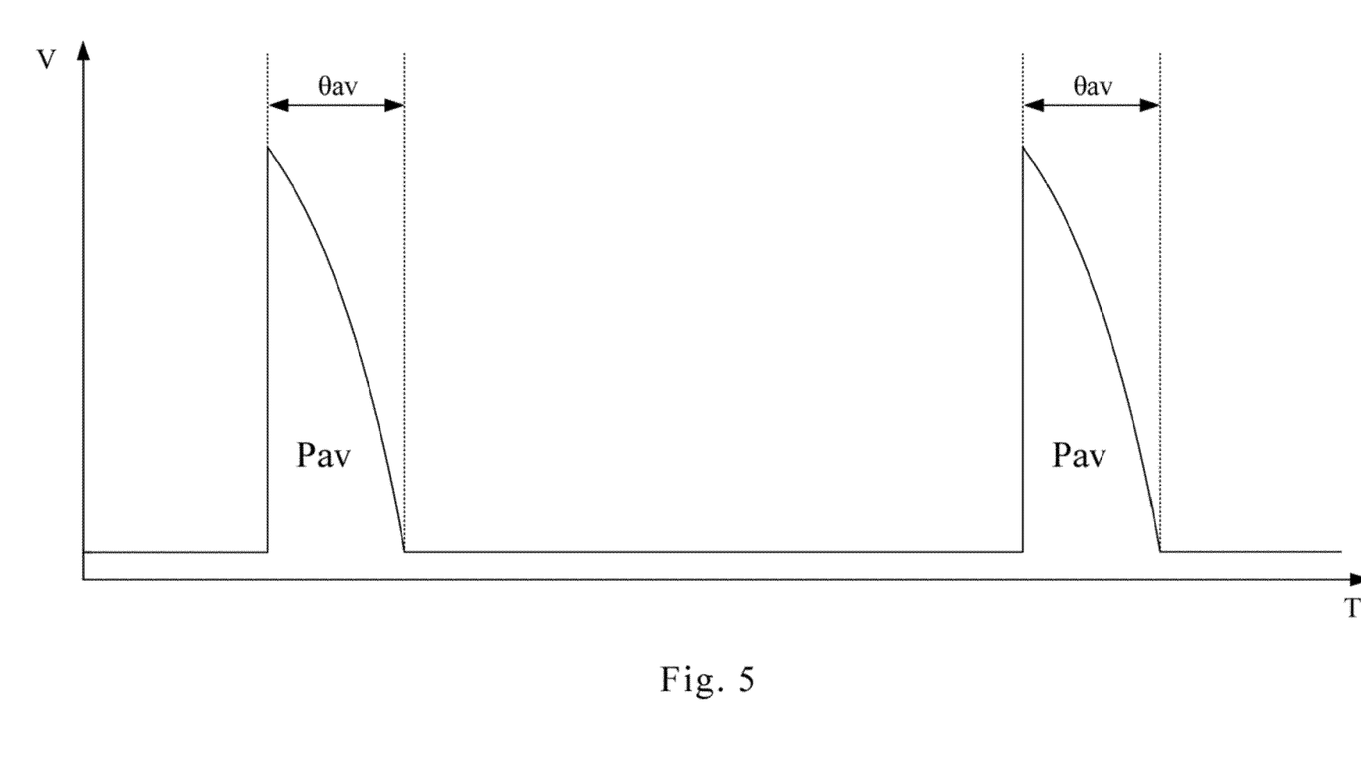
FIG. 5 is a waveform diagram illustrating an average waveform pulse generated by a sample-and-hold circuit of FIG. 2.

For example, in this embodiment, the sample-and-hold circuit 140 may sample the waveform pulses P2 and P3 from the waveform pulses shown in FIG. 4 for generating an average waveform pulse. Reference is also made to FIG. 5, which is a waveform diagram illustrating an average waveform pulse Pav generated by the sample-and-hold circuit 140. However, the invention is not limited to sampling two waveform pulses in a row. In another embodiment, the sample-and-hold circuit 140 may sample three or more waveform pulses in a row. In still other embodiments, the sample-and-hold circuit 140 may sample multiple wave pulses that are not necessarily in a row. Accordingly, the sample-and-hold circuit 140 may sample the dimming signal generated by the dimming module 120 and transform the dimming signal into a relatively steady waveform state (i.e., the average waveform pulse).

In the embodiment, the signal detection circuit 160 is coupled to the sample-and-hold circuit 140. When the sample-and-hold circuit 140 continuously samples the waveform pulses of the dimming signal to obtain the average waveform pulse Pav, the signal detection circuit 160 is used for extracting the signal waveform of the average waveform pulse Pav. The average waveform pulse Pav has an average conduction angle θav. The average conduction angle θav is generated by calculating the average value from the conduction angles of the sampled waveform pulses. For example, when the waveform pulses P2 and P3 are sampled by the sample-and-hold circuit 140, the average value generated from the conduction angle θ2 of the waveform pulse P2 and the conduction angle θ3 of the waveform pulse P3 becomes the average conduction angle θav.

The average power integrator circuit 180 is coupled with the signal detection circuit 160. The average power integrator circuit 180 is used for performing integration on the average waveform pulse Pav extracted by the signal detection circuit 160, so as to generate a current-controlling signal CON and transmit the same to the illumination lamp 220.

Figure 6:
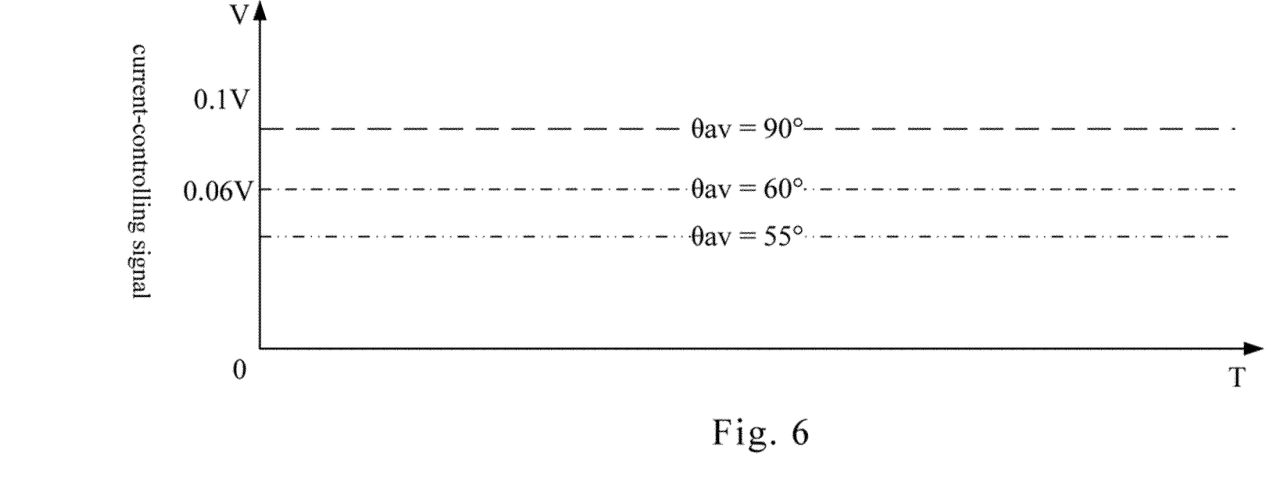
FIG. 6 is a relationship diagram illustrating a current-controlling signal relative to different average conduction angles in an embodiment of the disclosure.

It is to be noted that the average power integrator circuit 180 performs integration on the non-linear signal generated by the dimming module 120, which may be a TRIAC dimmer as described above, for converting the non-linear signal into the current-controlling signal CON, which can be represented as a direct current (DC) signal with a specific value. Reference is also made to FIG. 6 which is a relationship diagram illustrating the current-controlling signal CON relative to different average conduction angles θav in an embodiment of the disclosure. In the example shown in FIG. 6, when the average conduction angle θav is equal to 60 degrees, the current-controlling signal CON integrated by the average power integrator circuit 180 is a DC signal with a voltage level at 0.06 Volts. Because the current-controlling signal CON is a DC signal, when the average conduction angle θav is relatively low, the current-controlling signal CON can be prevented from oscillating up and down across the zero level. Therefore, non-linear distortion at low conduction angles can be reduced, such that blinking of the illumination lamp can be avoided.

As shown in FIG. 2, the current-controlling signal CON is transmitted to a driver circuit 222 of the illumination lamp 220. In this embodiment, the current-controlling signal CON is used for controlling the amplitude of an operating current $I_D$ generated by the driver circuit 222. The operating current $I_D$ goes through a light-emitting load 224 of the illumination lamp 220. The current-controlling signal CON controls the amplitude of the operating current $I_D$ and further allows the driving power of the driver circuit 222 to have a linear relationship relative to the average conduction angle θav. Accordingly, the adjustable dimming range, sensitivity and precision of the dimming function on the illumination control circuit 100 can enhanced.

In a practical experiment, the illumination control circuit 100 may cooperate with various kinds of dimmer components on the market, such as the LUTRON SKYLARK, LUTRON TOGGLER, LUTRON Rotary, WS-5008, etc. The illumination control circuit 100 may maintain the linear relationship between the driving power and the conduction angle in various kinds of the dimmer components.

Figure 7A:
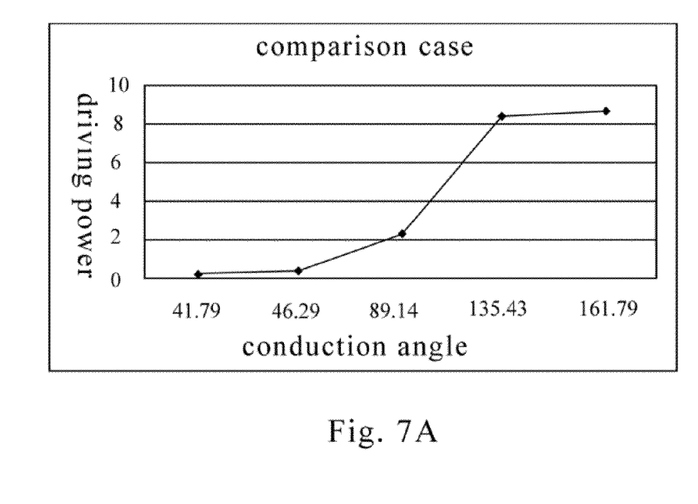
FIG. 7A and FIG. 7B are diagrams illustrating the relationship between a driving power and a conductive angle according to a comparison case and an experimental embodiment respectively.
Figure 7B:
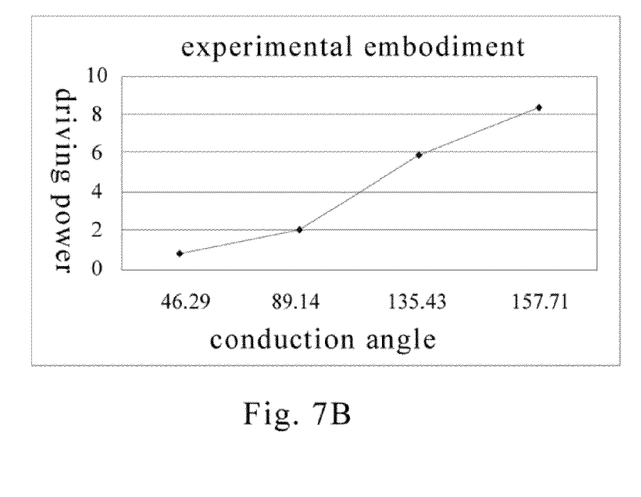

Reference is made to FIG. 7A and FIG. 7B, which are diagrams illustrating the relationship between the driving power and the conductive angle according to a comparison case and an experimental embodiment respectively. In the comparison case shown in FIG. 7A, the dimming signal generated by a WS-5008 dimmer is directly transmitted to an LED lamp that is available on the market (i.e., the Philips EnduraLED A19). In the experimental embodiment shown in FIG. 7B, the WS-5008 dimmer serves as the dimming module 120 disposed within the illumination control circuit 100 of this disclosure. The current-controlling signal processed by the illumination control circuit 100 is transmitted to the driver circuit of an LED lamp that is available on the market (i.e., the Philips EnduraLED A19). As shown in FIG. 7A and FIG. 7B, after modulation performed by the illumination control circuit 100, the driving power and the conduction angle have a better linear relationship therebetween.

Figure 8:
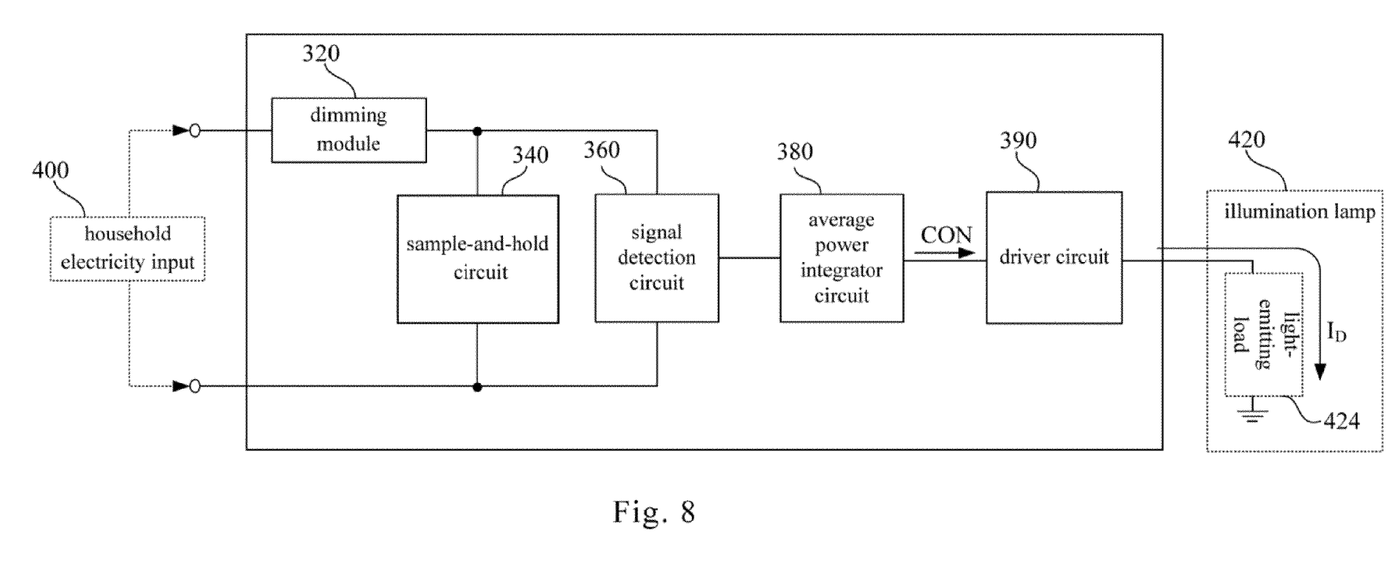
FIG. 8 is a block diagram illustrating an illumination control circuit according to another embodiment of the invention.

In the aforesaid embodiment, the illumination control circuit 100 generates a current-controlling signal CON and transmits the current-controlling signal CON to the illumination lamp 220, but the disclosure is not limited thereto. Reference is made to FIG. 8, which is a block diagram illustrating an illumination control circuit 300 according to another embodiment of the invention. In this embodiment, the illumination system includes a dimming module 320, a sample-and-hold circuit 340, a signal detection circuit 360, an average power integrator circuit 380 and a driver circuit 390.

The dimming module 320, which is coupled with the household electricity input 400, is configured for modulating an alternating current input signal from the household electricity input 400 and generating a dimming signal. The sample-and-hold circuit 340, which is coupled with the dimming module 320, is configured for continuously sampling waveform pulses of the dimming signal to obtain an average waveform pulse from sampled waveform pulses. The average waveform pulse has an average conduction angle. The signal detection circuit 360, which is coupled with the sample-and-hold circuit 360, is configured for extracting the average waveform pulse. The average power integrator circuit 380 is configured for performing integration on the average waveform pulse after sampling, so as to generate a current-controlling signal CON.

It is to be noted that the illumination control circuit 300 includes the driver circuit 390 coupled with the average power integrator circuit 380. The illumination control circuit 300 utilizes the driver circuit 390 to generate an operating current $I_D$ according to the current-controlling signal CON and transmit the same to the illumination lamp 420. A driving power of the driver circuit 390 and the average conduction angle have a linear relationship therebetween. Details about the components in the illumination control circuit 300 are similar to those of the components in the illumination control circuit 100 disclosed in the aforesaid embodiment, and so will not be repeated.

In this embodiment, the illumination control circuit 300 can be used to generate the operating current $I_D$ directly for driving the illumination lamp 420, and the luminance (brightness) of the illumination lamp 420 can be adjusted dynamically by adjusting the amplitude of the operating current $I_D$ generated by the illumination control circuit 300. This embodiment of the illumination control circuit 300 can be utilized in an illumination lamp 420 without a built-in driver circuit (or in an illumination lamp 420 in which the driver circuit thereof can not be adjusted dynamically).

In the embodiments described above, the illumination control circuit includes a dimming module for adjusting luminance of an illumination lamp, and it further includes some digital processing circuits to sample the dimming signals generated by the dimming module to generate an average waveform pulse with an average conduction angle, so as to control an operating current generated by the driver circuit according to the average waveform pulse. The dimming signal can be represented as a direct current (DC) value, so as to avoid non-linear distortion which occurs at a low conduction angle of the dimming waveform in a traditional design. The average conduction angle of the dimming module in the disclosure and the driving power of the driver circuit have a linear relationship therebetween.

Figure 9:
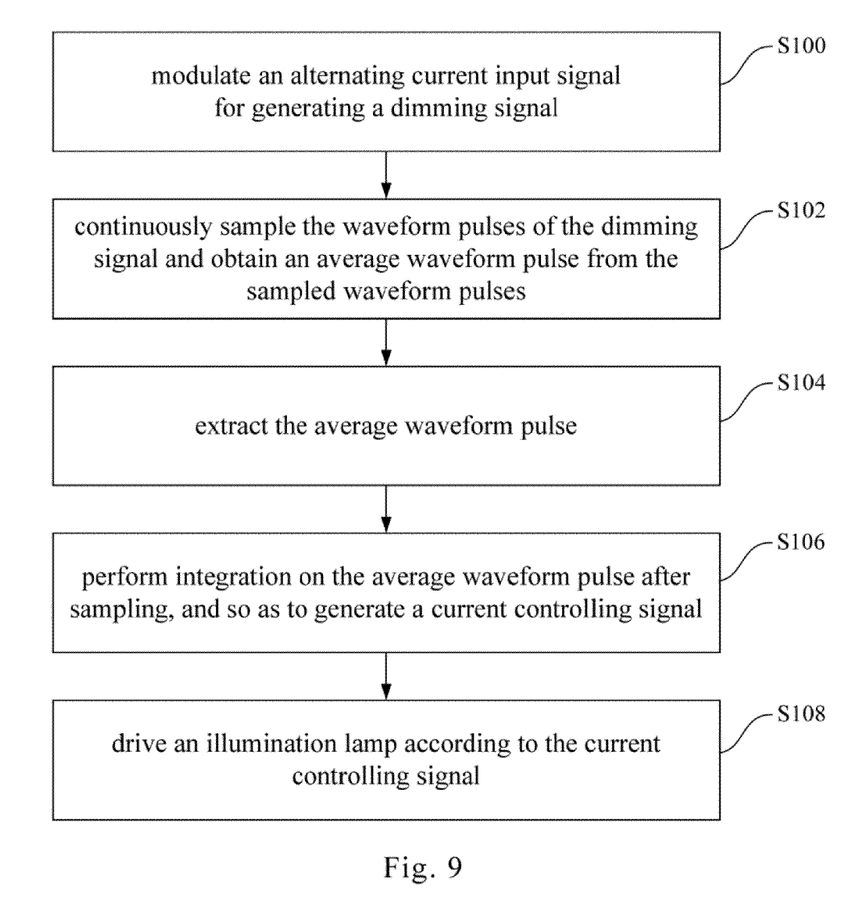
FIG. 9 is a flow chart illustrating an illumination control method according to another embodiment of the disclosure.

Reference is now made to FIG. 9, which is a flow chart illustrating an illumination control method according to an embodiment of the disclosure. The illumination control method can be used with the illumination control circuit 100 shown in FIG. 2, the illumination control circuit 300 shown in FIG. 8 or any equivalent illumination control circuit. First, step S100 is executed to modulate an alternating current input signal for generating a dimming signal. The dimming signal comprises a plurality of waveform pulses. Each of the waveform pulses has a conduction angle which is adjustable (see FIG. 3 and FIG. 4, and the relevant paragraphs describing the aforesaid embodiments).

Next, step S102 is executed to continuously sample the waveform pulses of the dimming signal to obtain an average waveform pulse from the sampled waveform pulses. Subsequently, step S104 is executed to extract the average waveform pulse having an average conduction angle corresponding to the conduction angles of the waveform pulses (see FIG. 5 and the relevant paragraphs describing the aforesaid embodiments).

Next, step S106 is executed to perform integration on the average waveform pulse after sampling, so as to generate a current-controlling signal (see FIG. 6 and the relevant paragraphs describing the aforesaid embodiments). In this embodiment, the current-controlling signal is configured for controlling the amplitude of an operating current going through the illumination lamp.

Finally, step S108 is executed to drive an illumination lamp according to the current-controlling signal and to maintain a linear relationship between a driving power of the driver circuit and the average conduction angle. In this embodiment, the average conduction angle, a signal level of the current-controlling signal and the amplitude of the operating current are in proportion to a luminance of the illumination lamp.

In the embodiments described above, the illumination control circuit and the illumination control method may realize the dimming function in an illumination lamp. The dimming signal is converted into a direct current (DC) value during the signal processing procedure in this disclosure, so as to avoid non-linear distortion which occurs at a low conduction angle of the dimming waveform in a traditional design. The average conduction angle of the dimming module in the disclosure and the driving power of the driver circuit have a linear relationship therebetween, such that blinking of the illumination lamp can be avoided, and also, the adjustable dimming range, sensitivity and preciseness of the dimming function can enhanced.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. An illumination control circuit, coupled between a household electricity input and an illumination lamp, the illumination control circuit comprising:
    a dimming module, coupled with the household electricity input, and configured for modulating an alternating current input signal from the household electricity input and generating a dimming signal, the dimming signal comprising a plurality of waveform pulses, each of the waveform pulses having a conduction angle which is adjustable;
    a sample-and-hold circuit, coupled with the dimming module, and configured for continuously sampling the waveform pulses of the dimming signal to obtain an average waveform pulse from sampled waveform pulses;
    a signal detection circuit, coupled with the sample-and-hold circuit, and configured for extracting the average waveform pulse, the average waveform pulse having an average conduction angle corresponding to the conduction angles of the waveform pulses; and
    an average power integrator circuit, coupled with the signal detection circuit, and configured for performing integration on the average waveform pulse after sampling, so as to generate a current-controlling signal and transmit the same to the illumination lamp, the current-controlling signal being configured for controlling a driver circuit of the illumination lamp, a driving power of the driver circuit and the average conduction angle having a linear relationship therebetween.

2. The illumination control circuit as claimed in claim 1, wherein the current-controlling signal is transmitted to the driver circuit of the illumination lamp, the current-controlling signal is configured for controlling an amplitude of an operating current generated by the driver circuit, and the operating current goes through a light-emitting load of the illumination lamp.

3. The illumination control circuit as claimed in claim 2, wherein the average conduction angle, a signal level of the current-controlling signal and the amplitude of the operating current are in proportion to a luminance of the illumination lamp.

4. An illumination control circuit, coupled between a household electricity input and an illumination lamp, the illumination control circuit comprising:
- a dimming module, coupled with the household electricity input, and configured for modulating an alternating current input signal from the household electricity input and generating a dimming signal, the dimming signal comprising a plurality of waveform pulses, each of the waveform pulses having a conduction angle which is adjustable;
- a sample-and-hold circuit, coupled with the dimming module, and configured for continuously sampling the waveform pulses of the dimming signal to obtain an average waveform pulse from sampled waveform pulses, the average waveform pulse having an average conduction angle corresponding to the conduction angles of the waveform pulses;
- a signal detection circuit, coupled with the sample-and-hold circuit, and configured for extracting the average waveform pulse;
- an average power integrator circuit, coupled with the signal detection circuit, and configured for performing integration on the average waveform pulse after sampling, so as to generate a current-controlling signal; and
- a driver circuit, coupled with the average power integrator circuit, the driver circuit generating an operating current and outputting the same to the illumination lamp according to the current-controlling signal, a driving power of the driver circuit and the average conduction angle having a linear relationship therebetween.

5. The illumination control circuit as claimed in claim 4, wherein the current-controlling signal is configured for controlling an amplitude of the operating current, and the operating current goes through a light-emitting load of the illumination lamp.

6. The illumination control circuit as claimed in claim 5, wherein the average conduction angle, a signal level of the current-controlling signal and the amplitude of the operating current are in proportion to a luminance of the illumination lamp.

7. An illumination control method, comprising:
- modulating an alternating current input signal for generating a dimming signal, the dimming signal comprising a plurality of waveform pulses, each of the waveform pulses having a conduction angle which is adjustable;
- continuously sampling the waveform pulses of the dimming signal and obtaining an average waveform pulse from the sampled waveform pulses;
- extracting the average waveform pulse having an average conduction angle corresponding to the conduction angles of the waveform pulses;
- performing integration on the average waveform pulse after sampling, so as to generate a current-controlling signal; and
- driving an illumination lamp according to the current-controlling signal, and maintaining a linear relationship between a driving power of the driver circuit and the average conduction angle.

8. The illumination control method as claimed in claim 7, wherein the current-controlling signal is configured for controlling an amplitude of an operating current going through the illumination lamp.

9. The illumination control method as claimed in claim 8, wherein the average conduction angle, a signal level of the current-controlling signal and the amplitude of the operating current are in proportion to a luminance of the illumination lamp.

* * * * *